(12) United States Patent
Robichaud

(10) Patent No.: US 11,273,603 B2
(45) Date of Patent: Mar. 15, 2022

(54) 3D PRINTING ASSEMBLY AND METHOD

(71) Applicant: LABORATOIRES BODYCAD INC., Quebec (CA)

(72) Inventor: Jean Robichaud, St-Aubert (CA)

(73) Assignee: LABORATOIRES BODYCAD INC., Quebec (CA)

( * ) Notice: Subject to any disclaimer, the term of this patent is extended or adjusted under 35 U.S.C. 154(b) by 146 days.

(21) Appl. No.: 16/540,122

(22) Filed: Aug. 14, 2019

(65) Prior Publication Data

US 2020/0055240 A1 Feb. 20, 2020

Related U.S. Application Data

(60) Provisional application No. 62/718,669, filed on Aug. 14, 2018.

(51) Int. Cl.
*B29C 64/245* (2017.01)
*B29C 64/188* (2017.01)
*B33Y 30/00* (2015.01)
*B33Y 10/00* (2015.01)

(52) U.S. Cl.
CPC .......... *B29C 64/245* (2017.08); *B29C 64/188* (2017.08); *B33Y 10/00* (2014.12); *B33Y 30/00* (2014.12)

(58) Field of Classification Search
CPC ...... B29C 64/245; B29C 64/40; B29C 64/188
See application file for complete search history.

(56) References Cited

U.S. PATENT DOCUMENTS

| 6,629,011 B1 | 9/2003 | Calderon et al. |
| 6,976,627 B1 | 12/2005 | Culp et al. |
| 8,155,775 B2 | 4/2012 | Batchelder |
| 8,196,825 B2 | 6/2012 | Turner et al. |
| 9,002,496 B2 | 4/2015 | Elsey |

(Continued)

FOREIGN PATENT DOCUMENTS

| JP | 6331324 B2 | 5/2018 |
| WO | 2017076983 A1 | 5/2017 |

(Continued)

OTHER PUBLICATIONS

Hussein, Ahmed et al.; Advanced lattice support structures for metal additive manufacturing; Journal of Materials Processing Technology 213; 2013; 1019-1026.

*Primary Examiner* — Joseph S Del Sole
*Assistant Examiner* — Jamel M Nelson
(74) *Attorney, Agent, or Firm* — Eversheds Sutherland (US) LLP

(57) ABSTRACT

There is disclosed a method for printing an article by additive manufacturing comprising providing an additive manufacturing system and a support plate having a block engagement location; engaging a support block having an article-printing surface with the support plate at the block engagement location; engaging the support plate with the additive manufacturing system; additive manufacturing an article on the article printing surface of the support block engaged with the support plate; and disengaging, from the support plate, the support block having the article printed thereon. There is also disclosed corresponding additive manufacturing support assembly, additive manufacturing kit and additive manufacturing assembly.

14 Claims, 14 Drawing Sheets

(56) References Cited

U.S. PATENT DOCUMENTS

| | | | |
|---|---|---|---|
| 9,561,622 B2 | 2/2017 | Das et al. | |
| 9,566,743 B2 | 2/2017 | Kozlak et al. | |
| 9,610,733 B2 | 4/2017 | Swanson et al. | |
| 9,656,428 B2 | 5/2017 | Voris et al. | |
| 9,740,974 B2 | 8/2017 | Kumar et al. | |
| 9,943,378 B2 | 4/2018 | Kieser | |
| 10,717,233 B1* | 7/2020 | Bulard | B33Y 10/00 |
| 2015/0378353 A1 | 12/2015 | Williams et al. | |
| 2018/0117854 A1* | 5/2018 | Hart | B22F 12/00 |
| 2018/0319077 A1* | 11/2018 | Blanchet | B29D 30/0606 |

FOREIGN PATENT DOCUMENTS

| | | |
|---|---|---|
| WO | 2017143005 A1 | 8/2017 |
| WO | 2018072034 A1 | 4/2018 |

\* cited by examiner

3D PRINTING ASSEMBLY AND METHOD

PRIOR APPLICATION

The present application claims priority from U.S. provisional patent application No. 62/718,669, filed on Aug. 14, 2018, and entitled "3D PRINTING ASSEMBLY AND METHOD", the disclosure of which being hereby incorporated by reference in its entirety.

TECHNICAL FIELD

The technical field relates to 3D printing, and more particularly to 3D printing methods and assemblies.

BACKGROUND

Typically, a plurality of articles are 3D-printed simultaneously on a single support plate via article supports printed simultaneously at same apart locations. Once the articles are printed, the article supports, integral with a respective one or respective ones of the articles, are cut from the support plate and the printed articles with their corresponding article supports are sent to an additional machining step, such as a Computer Numerical Control (CNC) machine tool. Once the printed articles with their corresponding article supports are removed from the support plate, the support plate is resurfaced and then can be used for another 3D printing process.

However, the removal of the assemblies including the article supports and the articles from the support plate can be difficult, and so can be the resurfacing of the support plate. Furthermore, the resurfacing of the surface plate is time consuming and expensive.

In view of the above, there is a need for a method and an assembly for printing one or more articles by additive manufacturing which would be able to overcome or at least minimize some of the above-discussed prior art concerns.

BRIEF SUMMARY

It is therefore an aim of the present disclosure to address the above-mentioned issues.

According to a general aspect, there is provided a method for printing at least one article by additive manufacturing, comprising providing an additive manufacturing system and a support plate having at least one block engagement location; engaging at least one support block having an article-printing surface with the support plate at a respective one of said at least one block engagement location; engaging the support plate with the additive manufacturing system; additive manufacturing at least one article on the article-printing surface of said at least one support block engaged with the support plate; and disengaging, from the support plate, said at least one support block having said at least one article printed thereon as a printed article and support block assembly.

According to another general aspect, there is provided an additive manufacturing support assembly for an additive manufacturing system, the additive manufacturing support assembly comprising: a support plate engageable with the additive manufacturing system, the support plate comprising a plurality of block engagement locations; and at least one support block selectively and removably engageable with the support plate at a respective one of said plurality of block engagement locations and having an article-printing surface for at least one article to be additive manufactured thereon.

According to another general aspect, there is provided an additive manufacturing kit for an additive manufacturing system, the additive manufacturing kit comprising: a support plate engageable to the additive manufacturing system, the support plate comprising a plurality of block engagement locations; and a plurality of support blocks, each one of the plurality of support blocks being selectively and removably engageable with the support plate at a respective one of said plurality of block engagement locations, each one of said plurality of support blocks having an article printing surface for at least an article to be additive manufactured thereon.

According to another general aspect, there is provided an additive manufacturing assembly comprising: an additive manufacturing system configured to print one or more articles by additive manufacturing; and an additive manufacturing support assembly according to the present disclosure, the support plate being engageable with the additive manufacturing system.

According to another general aspect, there is provided a method for printing one or more articles by additive manufacturing comprising providing an additive manufacturing system including a support plate having a plurality of block engagement locations; providing at least one support block removably engageable with the support plate and having an article printing surface; engaging the at least one support block with the support plate at a respective one of the block engagement locations; additive manufacturing at least one article on the article printing surface of the at least one support block; and removing the at least one support block having the at least one article printed thereon as a printed article and support block assembly from the support plate.

According to another general aspect, there is provided an additive manufacturing assembly comprising a support plate insertable in an additive manufacturing system, the support plate comprising a plurality of block engagement locations; and at least one support block selectively and removably engageable with the support plate at one of the plurality of block engagement locations and having an article printing surface for at least an article to be additive manufactured thereon.

Embodiments of the invention are described hereunder.

According to an aspect, the additive manufacturing system further comprises a base having a supporting surface and wherein engaging the support plate with the additive manufacturing system comprises mounting the support plate to the supporting surface of the base and securing the support plate thereto.

According to another aspect, mounting the support plate to the supporting surface of the base comprises removably mounting the support plate to the supporting surface of the base.

According to another aspect, engaging at least one support block having an article-printing surface with the support plate comprises: engaging at least one locating member of the at least one support block with at least one locating member of the support plate with the at least one locating member of the at least one support block being complementary in shape with the at least one locating member of the support plate; and securing the at least one support block to the support plate by engaging at least one coupling member of the at least one support block with at least one coupling member of the support plate.

According to another aspect, the at least one block engagement location comprises a plurality of block engagement locations, the method further comprising: providing a plurality of the at least one support block, each one having an article printing surface; and removably engaging each one of said plurality of the at least one support block at a respective one of said plurality of block engagement locations.

According to another aspect, the method further comprises adjusting the article printing surfaces of said plurality of the at least one support block at a substantially identical printing height; and wherein additive manufacturing at least one article comprises additive manufacturing at least one article on each one of the article printing surfaces of said plurality of the at least one support block.

According to another aspect, adjusting the article printing surfaces of said plurality of the at least one support block at a substantially identical printing height comprises wearing down at least one of the plurality of the at least one support block so that the article printing surfaces of said plurality of the at least one support block extend at the substantially identical printing height.

According to another aspect, wearing down at least one of the plurality of the at least one support block comprises grinding at least partially all of said plurality of the at least one support block.

According to another aspect, the additive manufacturing system further comprises a base and a level adjustment assembly operatively connected to the base, the method further comprising actuating the level adjustment assembly to adjust a vertical position of the base.

According to another aspect, additive manufacturing at least one article further comprises additive manufacturing a support portion on the article-printing surface of said at least one support block, said printed article being supported on the article-printing surface via the printed support portion.

According to another aspect, the printed support portion is made of a material having a stiffness greater than a stiffness of the printed article.

According to another aspect, the method further comprises providing a machining unit including a support block receiver; removably engaging a respective one of said at least one support block of said printed article and support block assembly with said support block receiver; and machining said at least one article printed on the article-printing surface of said respective one of said at least one support block engaged with said support block receiver.

According to another aspect, the method further comprises separating said at least one printed article from said respective one of said at least one support block; and disengaging said respective one of said at least one support block from said support block receiver of the machining unit.

According to another aspect, the method further comprises resurfacing the article-printing surface of said respective one of said at least one support block following separation of said at least one printed article therefrom.

According to another aspect, the machining unit comprises a marker locator, the method further comprising: additive manufacturing at least one 3D marker on said article-printing surface of said respective one of said at least one support block, said at least one 3D marker having a predetermined shape; when the printed article and support block assembly is engaged with the support block receiver of the machining unit and before machining said at least one printed article from said respective one of said at least one support block, determining at least one of a localization and an orientation of said at least one 3D marker using said marker locator; and localizing said at least one article printed on the article-printing surface of said respective one of said at least one support block using said at least one of the orientation and the localization of said at least one 3D marker.

According to another aspect, localizing said at least one article printed on the article-printing surface comprises determining spatial coordinates of the at least one article printed on the article-printing surface.

According to another aspect, the method further comprises providing a machining unit including at least one support block receiver; engaging the at least one support block having the at least one article printed thereon with the at least one support block receiver; machining sequentially or simultaneously the at least one article bonded to the at least one support block engaged with the at least one support block receiver; separating the at least one article from said support block; and disengaging the at least one support block from the at least one support block receiver of the machining unit.

According to another aspect, the method further comprises additive manufacturing at least one 3D marker on the article printing surface of the at least one support block simultaneously with the additive manufacturing of the at least one article on the article printing surface of the at least one support block, the at least one 3D marker having a predetermined shape; when the at least one support block is engaged with the at least one support block receiver of the machining unit, localizing the at least one 3D marker and determining an orientation of the at least one 3D marker having the predetermined shape; determining spatial coordinates of the at least one article printed on the article printing surface of the at least one support block engaged with the at least one support block receiver of the machining unit using the orientation and the localization of said at least one 3D marker; and automatically machining the at least one localized article.

According to another aspect, the at least one support block of the additive manufacturing assembly comprises a plurality of support blocks, each one of the plurality of support blocks having an article printing surface and being selectively and removably engageable with the support plate at a respective one of said plurality of block engagement locations, the article printing surfaces of the plurality of support blocks extending substantially in a same plane when the support blocks are engaged with the support plate.

According to another aspect, each one of said plurality of block engagement locations and said at least one support block comprise at least one coupling member configured to selectively cooperate together to removably engage said at least one support block with the support plate at each one of said plurality of block engagement locations.

According to another aspect, each one of said plurality of block engagement locations and said at least one support block comprise at least one locating member configured to selectively cooperate together to precisely position said at least one support block on the support plate at each one of said plurality of block engagement locations.

According to another aspect, the locating members of each one of said plurality of block engagement locations and said at least one support block form all or part of the coupling members.

According to another aspect, said at least one support block is selectively and removably engageable with at least one support block receiver of a machining unit.

According to another aspect, said at least one support block comprises at least one coupling member, said at least one coupling member being removably engageable with at least one of the support plate at at least one of the plurality of block engagement locations and said at least one support block receiver of the machining unit.

According to another aspect, the article-printing surface of said at least one support block is resurfacable.

According to another aspect, the additive manufacturing assembly further comprises at least one support block receiver mountable to a machining unit; the at least one support block being selectively and removably engageable with the at least one support block receiver.

According to another aspect, the at least one support block comprises at least one coupling member, the at least one coupling member being engageable with at least one of the support plate at at least one of the block engagement locations and the at least one support block receiver of the machining unit.

According to another aspect, the plurality of support blocks of the additive manufacturing kit comprises support blocks having at least one of different shapes and different dimensions.

According to another aspect, the additive manufacturing kit further comprises at least one support block receiver engageable with a machining unit, at least one of said plurality of support blocks being selectively and removably engageable with said at least one support block receiver.

According to another aspect, each one of said plurality of block engagement locations and each one of said plurality of support blocks comprise at least one coupling member configured to selectively cooperate together to removably engage each one of said plurality of support blocks with the support plate at a respective one of said plurality of block engagement locations.

According to another aspect, each one of said plurality of block engagement locations and each one of said plurality of support blocks comprise at least one locating member configured to selectively cooperate together to precisely position each one of said plurality of support blocks on the support plate at a respective one of said plurality of block engagement locations.

DETAILED DESCRIPTION

Figure 1:
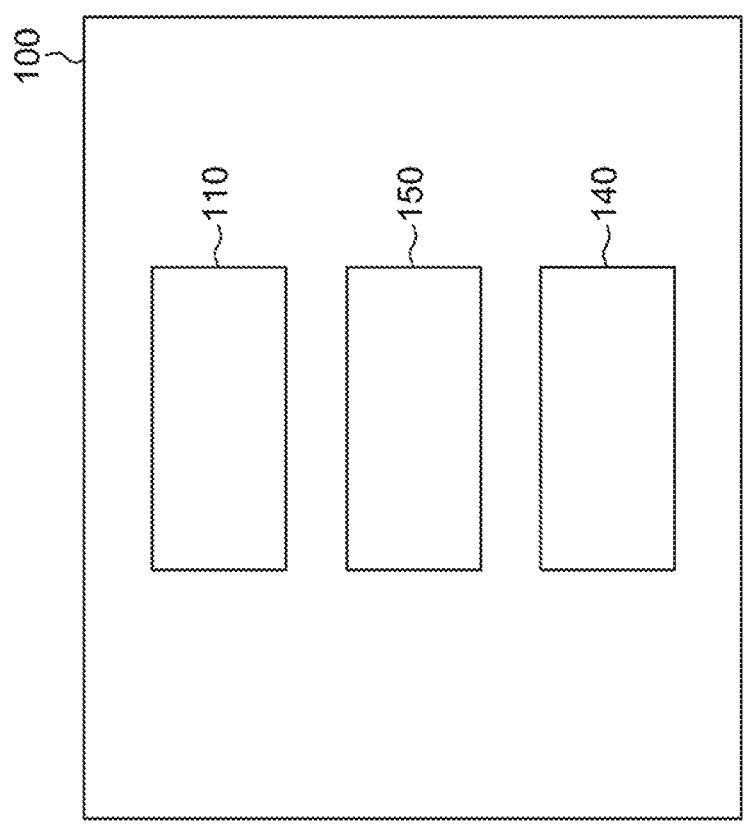
FIG. 1 is a schematic representation of an additive manufacturing assembly in accordance with an embodiment.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures only and should not be considered limiting. Moreover, the figures are meant to be illustrative of certain characteristics of the custom helmet and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

It is to be understood that the phraseology and terminology employed herein is not to be construed as limiting and are for descriptive purpose only.

In the above description, an embodiment is an example or implementation. The various appearances of "one embodiment," "an embodiment" or "some embodiments" do not necessarily all refer to the same embodiments.

Although various features may be described in the context of a single embodiment, the features may also be provided separately or in any suitable combination. Conversely, although the disclosure may be described herein in the context of separate embodiments for clarity, it may also be implemented in a single embodiment.

The principles and uses of the teachings of the present disclosure may be better understood with reference to the accompanying description, figures and examples.

It is to be understood that where the specification states that a component, feature, structure, or characteristic "may", "might", "can" or "could" be included, that particular component, feature, structure, or characteristic is not required to be included.

Methods of the present disclosure may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the disclosure belongs.

Additive Manufacturing Assembly

Referring now to the drawings, and more particularly to FIG. 1, there is shown an additive manufacturing assembly 100 comprising an additive manufacturing system 110 configured to print one or more articles by additive manufacturing, and a machining unit 150 configured to machine the one or more additive manufactured articles.

Figure 2:
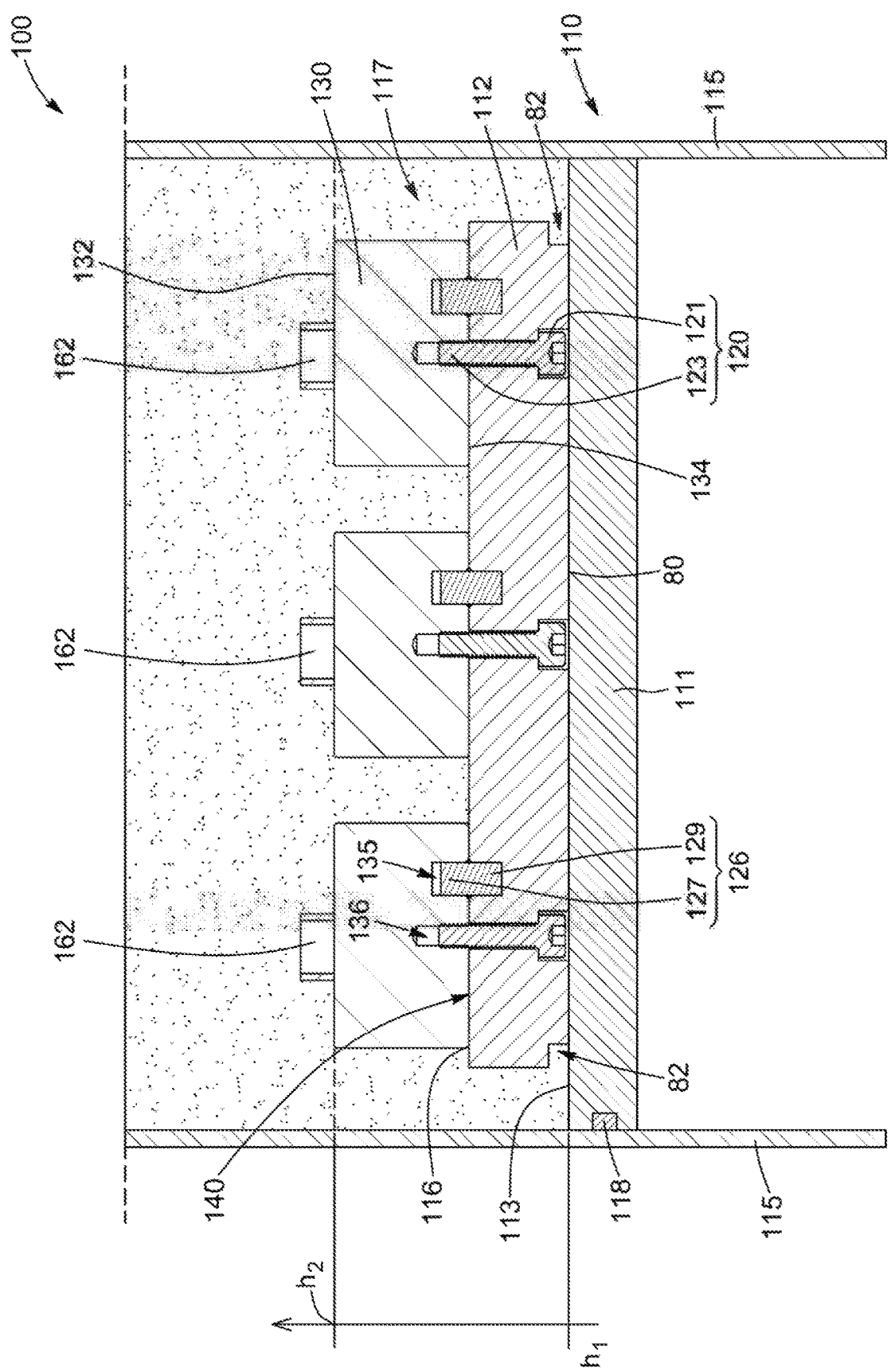
FIG. 2 is a cross-section view of an additive manufacturing system and an additive manufacturing support assembly in accordance with an embodiment, the additive manufacturing support assembly comprising a support plate and a plurality of support blocks engaged therewith.

The additive manufacturing assembly 100 further comprises an additive manufacturing support assembly 140. As shown in FIG. 2, the additive manufacturing support assembly 140 comprises a support plate 112 insertable in the additive manufacturing system 110 and one or more support blocks 130 removably mountable to the additive manufacturing system 110 and to the machining unit 150. As detailed below, in the embodiment shown, the support blocks 130 of the additive manufacturing support assembly 140 are selectively and removably engageable with the support plate 112.

Additive Manufacturing System and Support Plate of the Additive Manufacturing Support Assembly The additive manufacturing system 110 can comprise a single layer laser sintering machine or any other additive manufacturing machine.

As represented in FIG. 2, the additive manufacturing system 110 comprises a base 111 having a supporting (or upper) surface 113. In the embodiment shown, the base 111 is substantially rectangular and the supporting surface 113 extends in a substantially horizontal plane. In the embodiment shown, the supporting surface 113 of the base 111 extends at a first height h1.

In the embodiment shown, the additive manufacturing system 110 further comprises sidewalls, the base 111 being mounted to the sidewalls 115 so as to define together an enclosure 117 configured to receive, amongst others, the additive manufacturing support assembly 140 so as to print articles by additive manufacturing. The additive manufacturing system 110 further comprises a level adjustment assembly 118 (for instance electrically coupled to an electric motor—not represented) configured to cooperate with (or operatively connected to) the sidewalls 115 and the base 111, so as to control and adjust a vertical position—or height—of the supporting surface 113 of the base 111.

In the embodiment shown, the support plate 112 of the additive manufacturing support assembly 140 is removably mounted to the supporting surface 113 of the base 111 of the additive manufacturing system 110. In the embodiment shown, the support plate 112 is at least partially made of a thermally conductive material.

Figure 3:
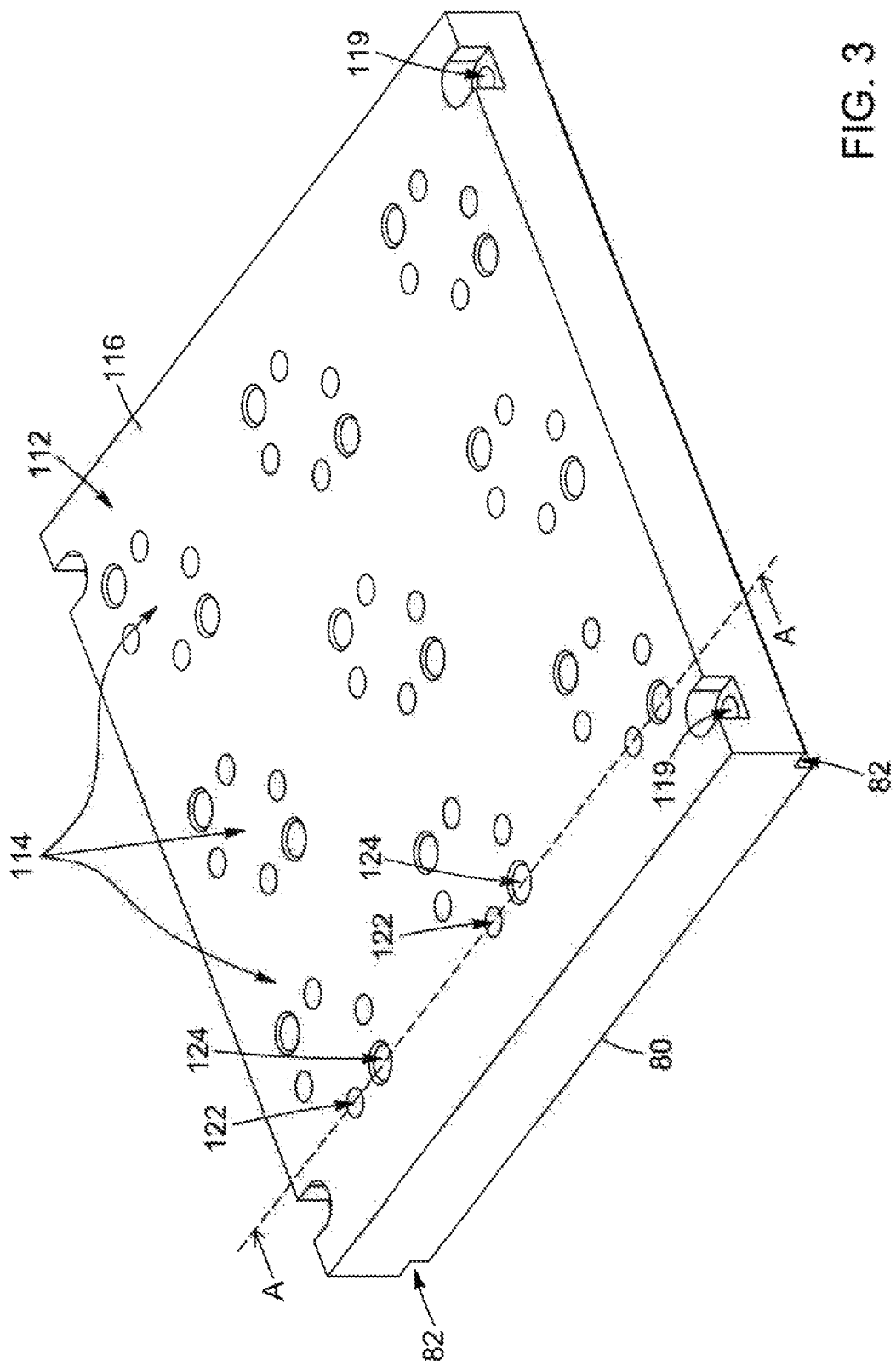
FIG. 3 is a top perspective view of the support plate of FIG. 2.

In the embodiment shown, as represented in FIG. 3, fastener-receiving apertures 119 (for instance through threaded holes 119 configured to cooperate with screws or any other suitable mechanical fasteners) extend through the support plate 112. The fastener-receiving apertures 119 are configured to face corresponding fastener-receiving apertures (not represented) formed in the supporting surface 113 of the base 111 of the additive manufacturing system 110 and to receive mechanical fasteners so as to engage—for instance removably—the support plate 112 to the supporting surface 113 of the base 111 of the additive manufacturing system 110 in a stationary configuration. Any other suitable mechanical fasteners could be conceived to engage—for instance in a removable manner—the support plate 112 with the base 111.

In the embodiment shown, the support plate 112 is superposable to the supporting surface 113 of the base 111 and removably securable thereto. It is thus understood that, depending on the shape, dimension and other characteristics of the articles to be printed or additive manufactured, support plates of different shapes and dimensions can be secured to the supporting surface 113 of the base 111. It could also be conceived an additive manufacturing system 110 that would be shaped and dimensioned to receive a plurality of support plates.

In the embodiment shown, as represented for instance in FIG. 3, longitudinal coupling indentations 82 are formed in a lower surface 80 of the support plate 112, along parallel longitudinal edges thereof, so as to contribute to the mounting of the support plate 112 to the base 111 of the additive manufacturing system 110. For instance the longitudinal coupling indentations 82 are selectively couplable to coupling portions (not represented) complementary in shape, protruding for instance from the supporting surface 113 of the base 111.

The support plate 112 further comprises a plurality of block engagement locations 114 formed therein.

It should be understood that the expression "block engagement location" designates a position or a site of the support plate 112—and more particularly of a block engagement (upper) surface 116 thereof—occupied or available for occupancy or marked by some distinguishing feature.

As represented in FIG. 3, the block engagement surface 116 of the support block 112 comprises the above-mentioned block engagement locations 114. In the embodiment shown, the support plate 112 has a substantially rectangular shape and is configured, as mentioned above, to be fixedly and precisely secured to the supporting surface 113 of the base 111. When the support plate 112 is secured to the base 111 of the additive manufacturing system 110, the block engagement surface 116 of the support plate 112 extends in a substantially horizontal plane (i.e. in a plane substantially parallel to the supporting surface 113 of the base 111, in the embodiment shown).

In the first embodiment of the support plate 112 represented in FIG. 3, the support plate 112 comprises nine block engagement locations 114. It is appreciated that the shape, the configuration, the location and the number of the block engagement locations 114 could vary from the embodiment shown.

In the embodiment shown, the block engagement locations 114 of the support plate 112 have a similar configuration, so that the following description of one of the block engagement locations 114 will apply to any of them.

Figure 4:
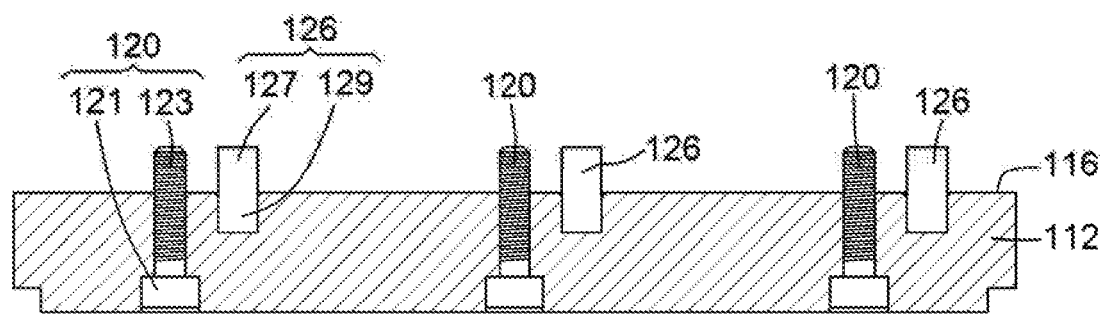
FIG. 4 is a sectional view of the support plate of FIG. 3, taken along cross-section lines A-A of FIG. 3, with coupling members and locating members engaged therewith.

As represented in FIGS. 3 and 4, the block engagement location 114 comprises a plurality of coupling members 120. In the embodiment shown, each of the coupling members 120 comprises a body 121 engaged in an opening 122 formed in the support plate 112 and accessible from the block engagement surface 116, and a coupling head 123 protruding from the block engagement surface 116 of the support plate 112. In the embodiment shown, the coupling head 123 is threaded. In the embodiment shown, each one of the block engagement locations 114 comprises four coupling members 120 configured in a substantially square arrangement. It is appreciated that the shape, the configuration, the location, and the number of the coupling members 120 could vary from the embodiment shown. For instance, the coupling members 120 could comprise only a coupling head protruding from the block engagement surface 116 of the support plate 112, the coupling head being secured—for instance glued or riveted—to the block engagement surface 116 of the support plate 112. The coupling members 120 couple also comprise only an opening formed in the support plate 112 and accessible from the block engagement surface 116 thereof.

The block engagement location 114 further comprises a plurality of locating members 126. In the embodiment shown, each of the locating members 126 comprises a locating head 127 protruding from the block engagement surface 116 of the support plate 112, and a locating body 129 engaged in an opening 124 formed in the support plate 112 to secure the locating member 126 to the support plate 112. In the embodiment shown, the block engagement location 114 comprises two locating members 126. It is appreciated that the shape, the configuration, the location, and the number of the locating members 126 could vary from the embodiment shown.

Figure 8:
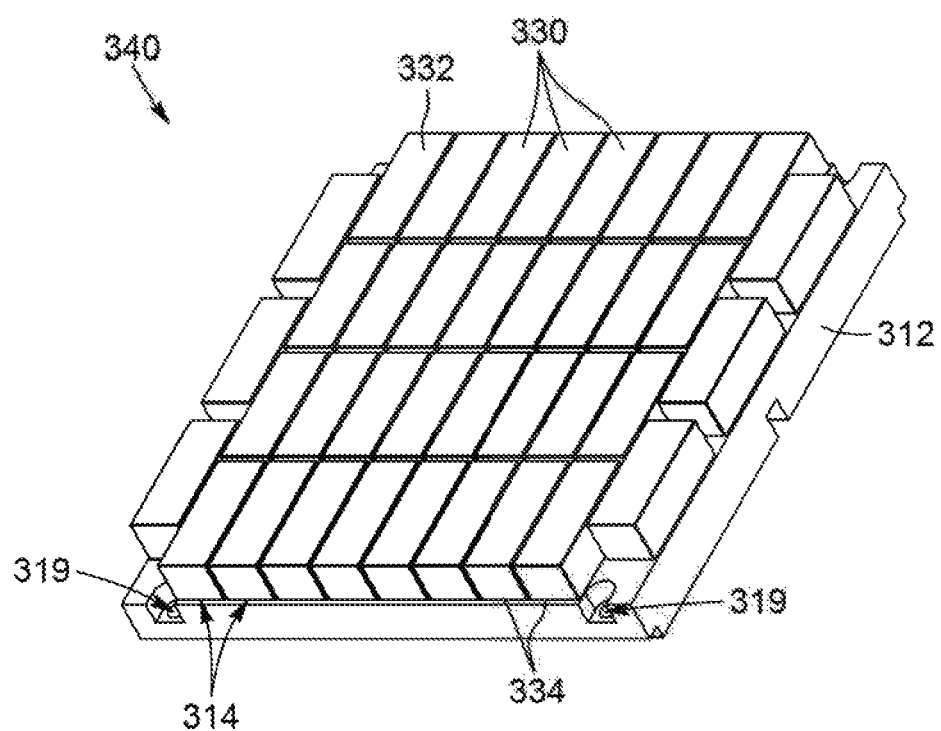
FIG. 8 is a top perspective view of an additive manufacturing support assembly in accordance with another embodiment.
Figure 9:
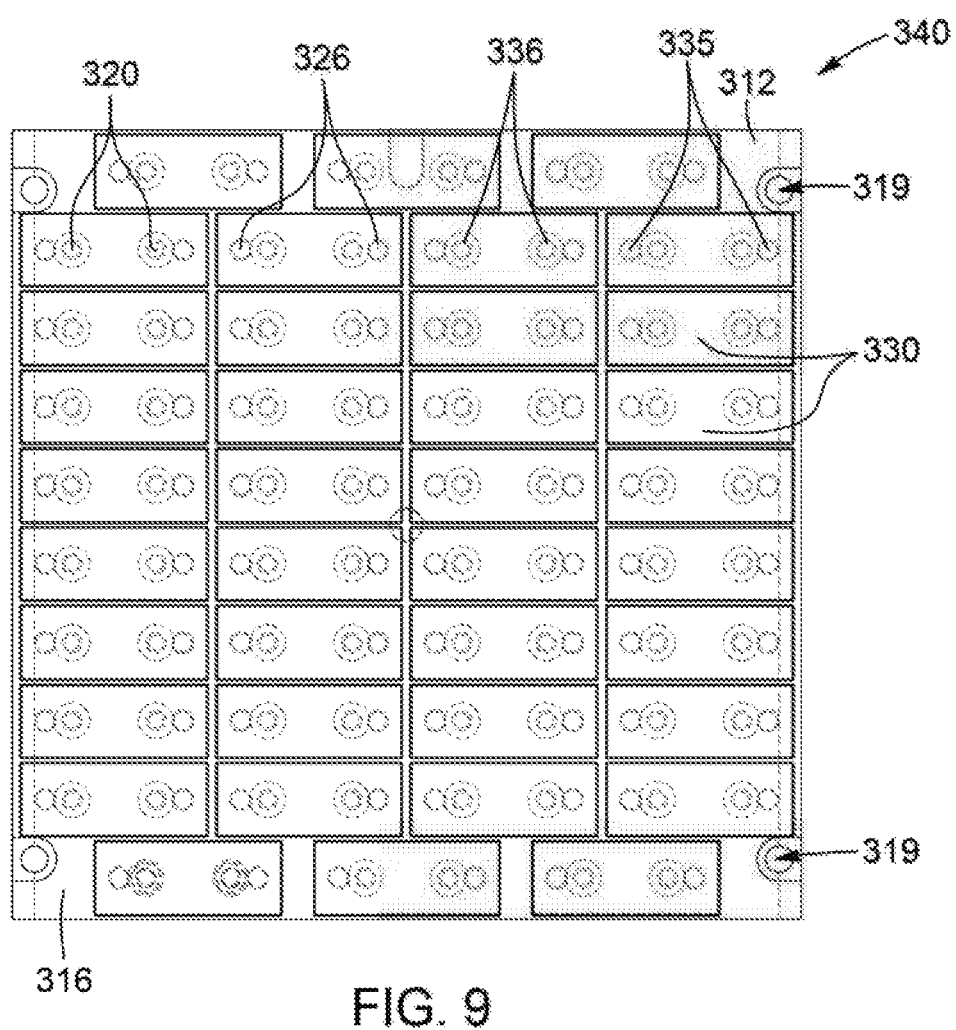
FIG. 9 is a top plan view of the additive manufacturing support assembly of FIG. 8, the coupling members and the locating members being represented in dotted lines.

In the second embodiment of the additive manufacturing support assembly 340 shown in FIGS. 8 and 9, the support plate 312 comprises fastener-receiving apertures 319 and ten rows of block engagement locations 314, some of the rows including three block engagement locations 314, some other rows including four block engagement locations 314. For instance and without being limitative, each block engagement location 314 comprises two coupling members 320 and two locating members 326 for support blocks 330 to be removably mounted to the upper surface 316 of the support plate 312.

It is appreciated that the shape, the configuration, the number, and the location of the block engagement locations 114, 314, of the coupling members 120, 320, of the locating members 126, 326 and of the fastener-receiving apertures 119, 319 can vary from the embodiments shown.

It could also be conceived a support plate in which the locating members and the coupling members would be formed by the same elements. In other words, the coupling members could be designed so as to also ease the engaging of the support block with the support plate.

Machining Unit

The machining unit 150 is configured to machine articles printed—or additive manufactured—by additive manufacturing (for instance by the additive manufacturing system 110). In some embodiments, the machining unit 150 comprises a Computer Numerical Control (CNC) machine tool.

Figure 12:
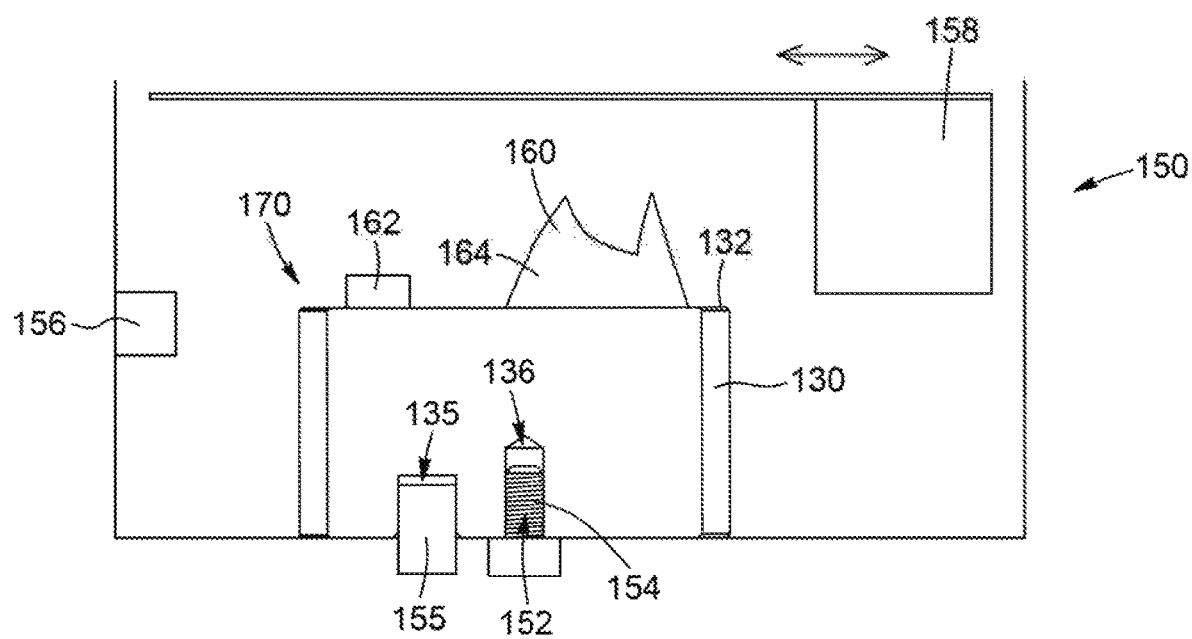
FIG. 12 is a cross-section view of a machining unit of an embodiment of the additive manufacturing assembly together with one of the support blocks of FIG. 2.

As represented in FIG. 12, the machining unit 150 comprises at least one support block receiver 152. In the embodiment shown, the support block receiver 152 comprises at least one coupling head 154. In the embodiment shown, the machining unit 150 further comprises at least one support block locators 155, the use of which will be described below.

The machining unit 150 further comprises a marker locator 156 and a machining head 158, which can be displaceable with respect to the support block receiver 152.

Support Blocks of the Additive Manufacturing Support Assembly

Figure 7:
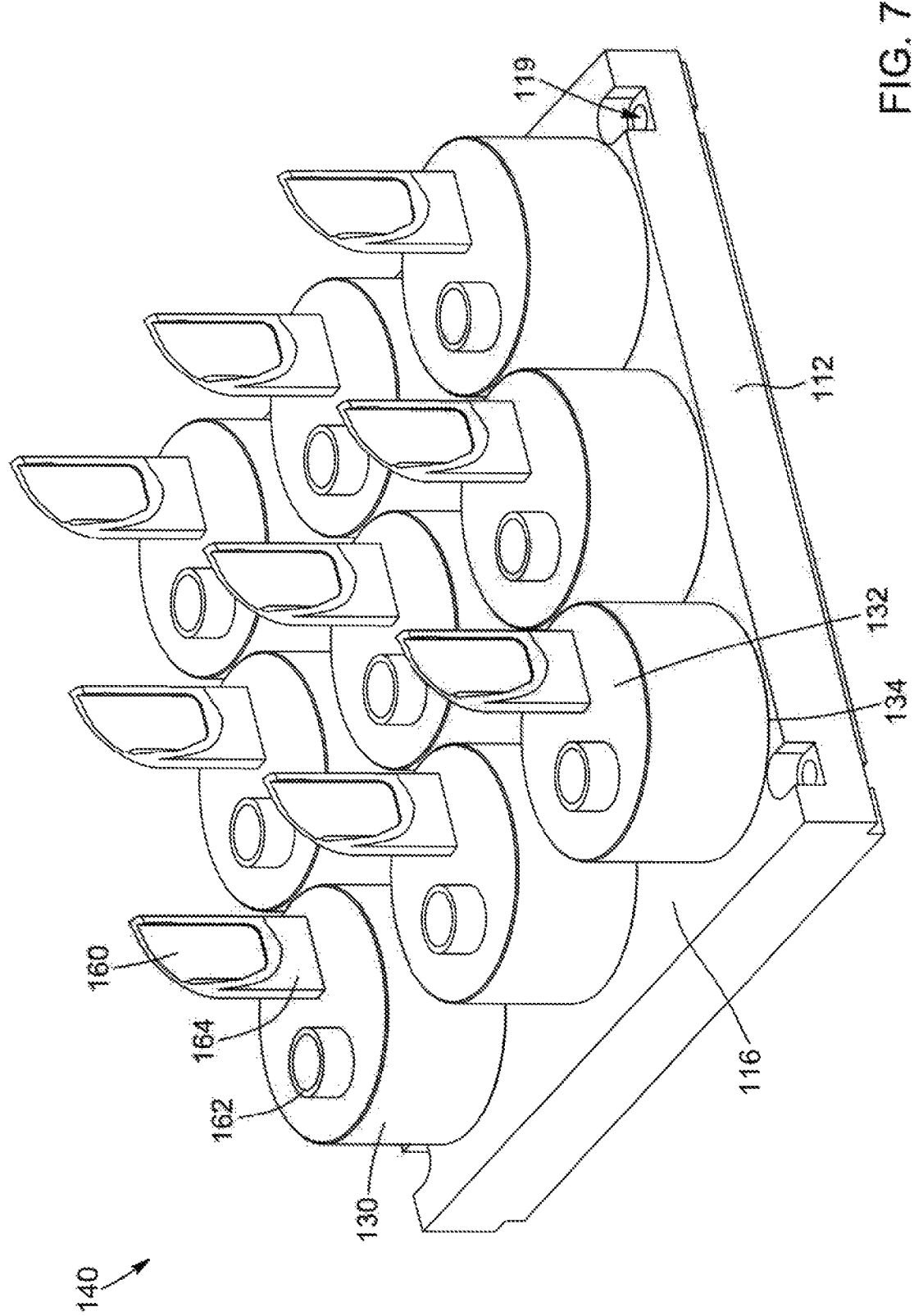
FIG. 7 is a top perspective view of the additive manufacturing support assembly of FIG. 2.

In the first embodiment of the additive manufacturing support assembly 140 as represented in FIGS. 2 and 7, all the support blocks 130 have a similar shape, so that the following description of one of the support blocks 130 will apply to any of them.

For instance and without being limitative, as represented in FIGS. 6, 7, 10 and 11, the support block 130 has a substantially cylindrical shape and comprises a substantially circular upper article-printing surface 132 and a substantially circular opposed lower contact surface 134. For instance, the upper article-printing surface 132 and the lower contact surface 134 extend in substantially parallel planes. When the support block 130 is mounted to the additive manufacturing system 110 via the support plate 112, as represented in FIG. 2, or is mounted to the machining unit 150, as represented in FIG. 12, the article printing surface 132 and the contact surface 134 both extend in a substantially horizontal plane.

Figure 5:
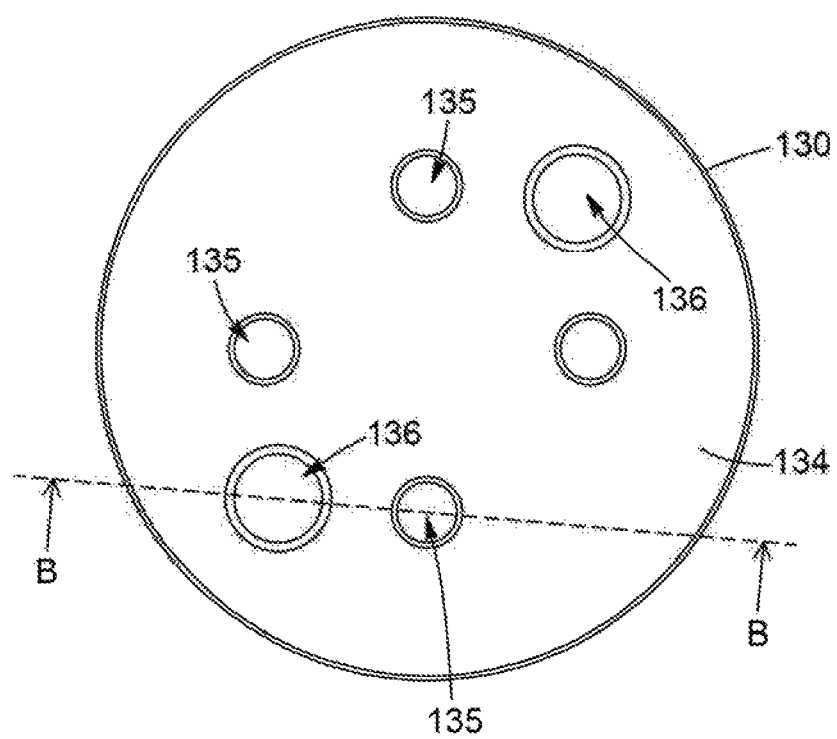
FIG. 5 is a bottom plan view of one of the support blocks of FIG. 2.
Figure 6:
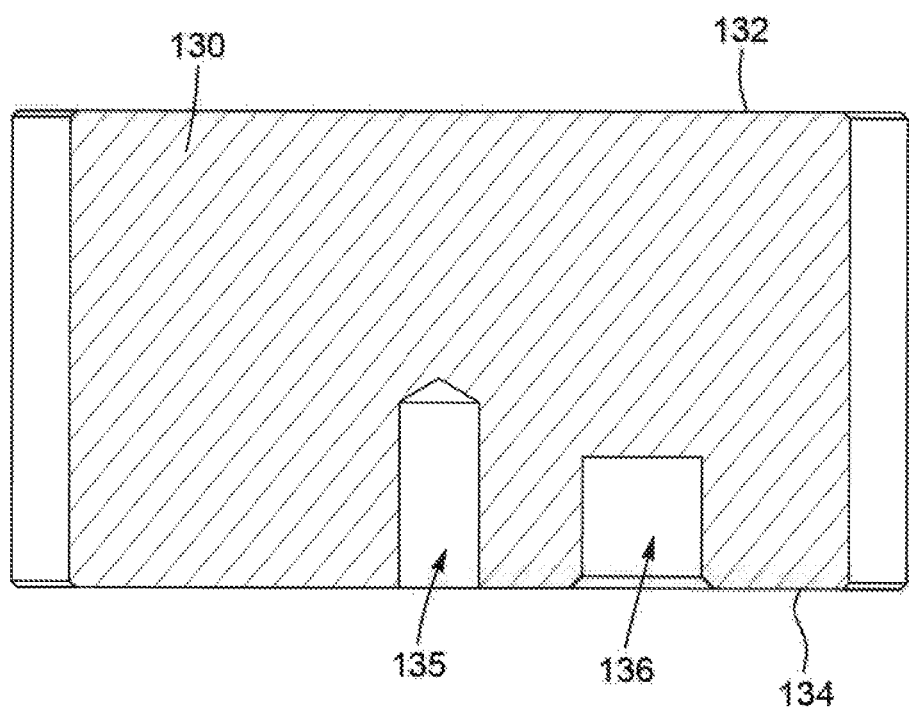
FIG. 6 is a sectional view of the support block of FIG. 5, taken along cross-section lines B-B of FIG. 5.

The support block 130 is engageable with the support plate 112 at one of the block engagement locations 114. As represented in FIG. 5, the support block 130 comprises locating members 135 that are configured to cooperate with the locating members 126 of the support plate 112 to precisely locate or position the support block 130 on the block engagement surface 116 of the support plate 112. In the embodiment shown, the locating members 135 comprise substantially cylindrical holes accessible from the contact surface 134 of the support block 130. The locating members 135 are dimensioned to receive the locating heads 127 of the locating members 126 of the support plate 112. It is appreciated that the shape, the configuration, and the location of the locating members 135, 126 of the support block 130 and the support plate 112 can vary from the embodiment shown. In an embodiment, the locating members 135 are complementary in shape with the locating heads 127 of the locating members 126.

As represented in FIG. 5, the support block 130 further comprises coupling members 136. In the embodiment shown, the coupling members 136 comprise threaded holes 138 accessible from the contact surface 134 of the support block 130. The coupling members 136 are shaped and dimensioned to cooperate with the threaded coupling heads 123 of the coupling members 120 of the support plate 112. The coupling members 136 are thus configured to engage the support block 130 at a respective one of the block engagement locations 114 of the support plate 112. In the embodiment shown, the locating of the support block 130 on the block engagement surface 116 of the support plate 112 and the coupling of the support block 130 with the support plate 112 is ensured respectively by female/male locating members 135, 126 and by female/male coupling members 136, 120 arranged respectively in the support block 130 and on the support plate 112. It is however appreciated that the shape, the configuration, and the location of the locating members 135, 126 and the coupling members 136, 120 of the support block 130 and the support plate 112 can vary from the embodiment shown. It is further understood that the locating members 135 and the coupling members 136 of the support block 130 could be formed by the same elements. In other words, the coupling members 136 and/or the locating members 135 could be configured to ease and secure the arrangement of the support block 130 with the support plate 112.

The support block 130 is also engageable with the machining unit 150, as represented in FIG. 12. The locating members 135 of the support block 130 are further configured to cooperate with the support block locators 155 of the machining unit 150 to precisely locate the support block 130 in the machining unit 150. In the embodiment shown, the same locating members 135 as the ones configured to cooperate with the locating members 126 of the support plate 112 (to at least partially receive the locating head 127 of the locating members 126, in the embodiment shown) are configured to cooperate with the support block locators 155 of the machining unit 150 (i.e. to receive a portion thereof, in the embodiment shown). Different locating members 135 of the support block 130 for locating the support block 130 on the support plate 112 and in the machining unit 150 could however alternatively be conceived.

As represented in FIG. 12, the coupling members 136 of the support block 130 are also configured to cooperate with the support block receivers 152 of the machining unit 150 to precisely secure the support block 130 in the machining unit 150. In the embodiment shown, the same coupling members 136 as the ones configured to cooperate with the coupling members 120 of the support plate 112 (i.e. configured to at least partially receive the coupling head 123 of the coupling members 120) are configured to cooperate with the support block receivers 152 of the machining unit 150 (i.e. to receive a portion thereof, in the embodiment shown). Different coupling members 136 of the support block 130 for coupling the support block 130 to the support plate 112 and to the machining unit 150 could however alternatively be conceived.

In the second embodiment of the additive manufacturing support assembly 340 represented in FIGS. 8 and 9, the support blocks 330 have a similar shape, so that the following description of one of the support blocks 330 will apply to any of them.

In the second embodiment shown, the support block 330 forms substantially a parallelogram and comprises a substantially rectangular upper article printing surface 332 and a substantially rectangular opposed lower contact surface 334. When the support block 330 is mounted to the additive manufacturing system 110 via the support plate 312, or is mounted to the machining unit 150 (not represented), the article printing surface 332 and the contact surface 334 of the support block 330 both extend in a substantially horizontal plane.

Similarly to the first embodiment of the support blocks 130, the support block 330 comprises locating members 335 and coupling members 336 configured to cooperate respectively with locating members 326 and coupling members 320 of the support plate 312, to arrange (or position) and secure the support block 330 to the upper surface 316 of the support plate 312.

It is appreciated that the shape, the number, and the configuration of the support blocks 130, 330 and their relative arrangement with respect to the support plate 112, 312 and to the machining unit 150 can vary from the first and second embodiments shown.

The present disclosure also relates to an additive manufacturing kit, comprising a support plate 112, 312 insertable in an additive manufacturing system 110, the support plate 112, 312 comprising a plurality of block engagement locations 114, 314 and a plurality of support blocks 130, 330 selectively and removably engageable with the support plate 112, 312 at respective block engagement locations 114, 314. For instance, the support blocks comprise support blocks having different shapes and/or dimensions for the support blocks 130, 330 to be adapted to different articles to be additive manufactured. The kit might further comprise a support block receiver 152 and/or a support block locator 155 engageable to a machining unit 150, for the support blocks 130, 330 to being selectively, easily and removably engageable with the machining unit 150.

Method for Printing Articles by Additive Manufacturing

The present disclosure also concerns a method 200 for printing one or more articles by additive manufacturing.

For instance, the method 200 might be realized using an additive manufacturing assembly 100 according to the present disclosure.

Figure 13:
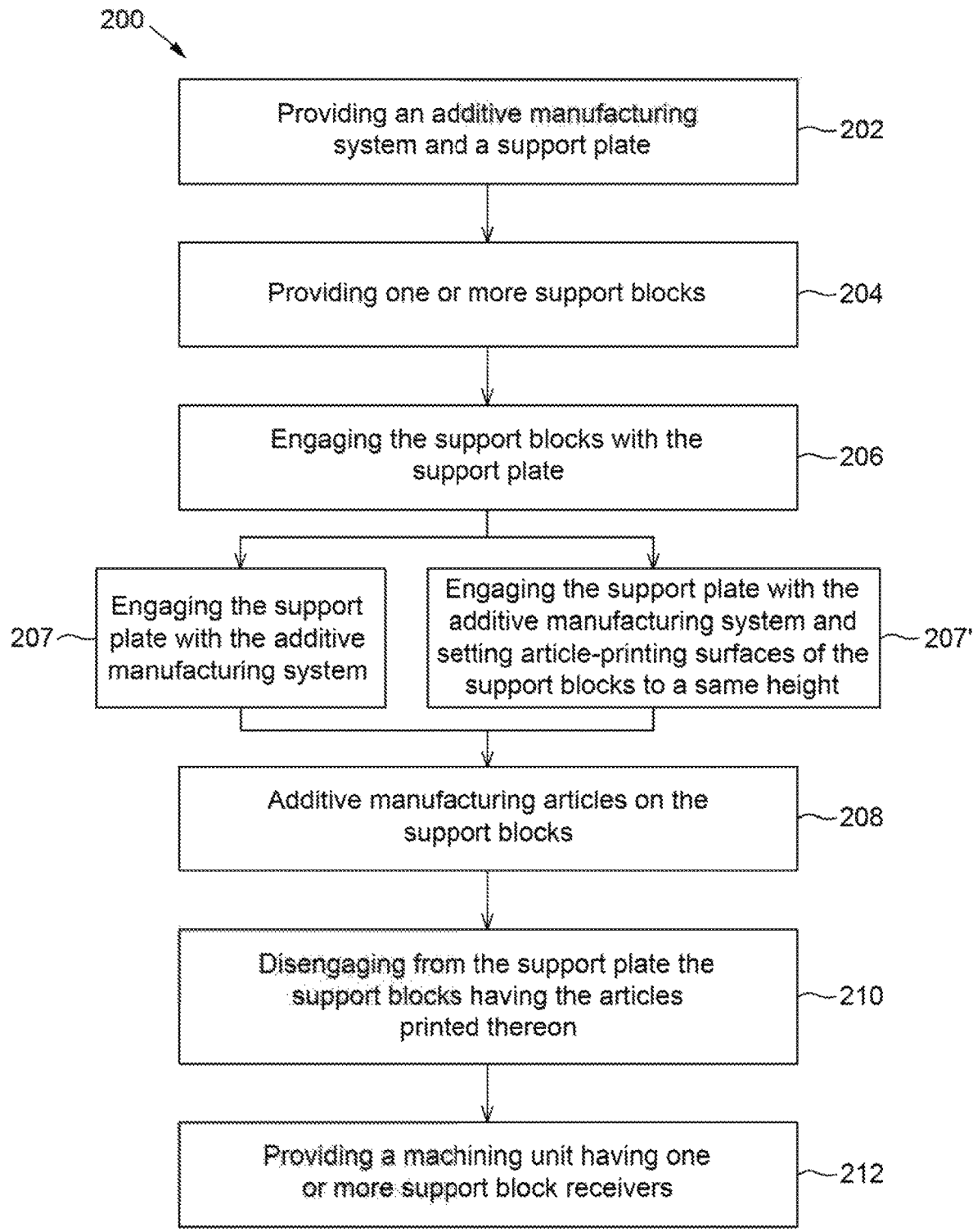
FIGS. 13 to 15 are diagrams summarizing a method for printing one or more articles by additive manufacturing in accordance with an embodiment.
Figure 14:
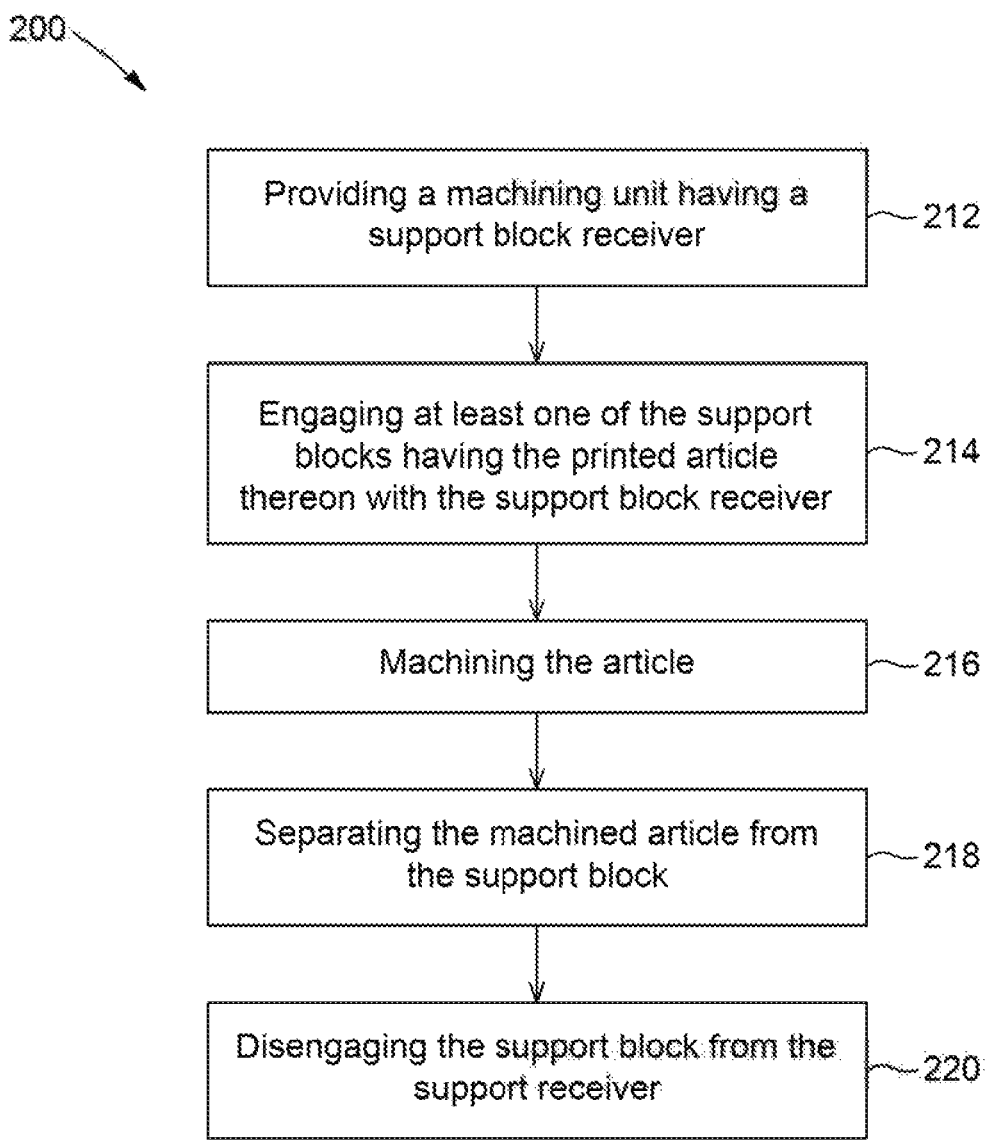
Figure 15:
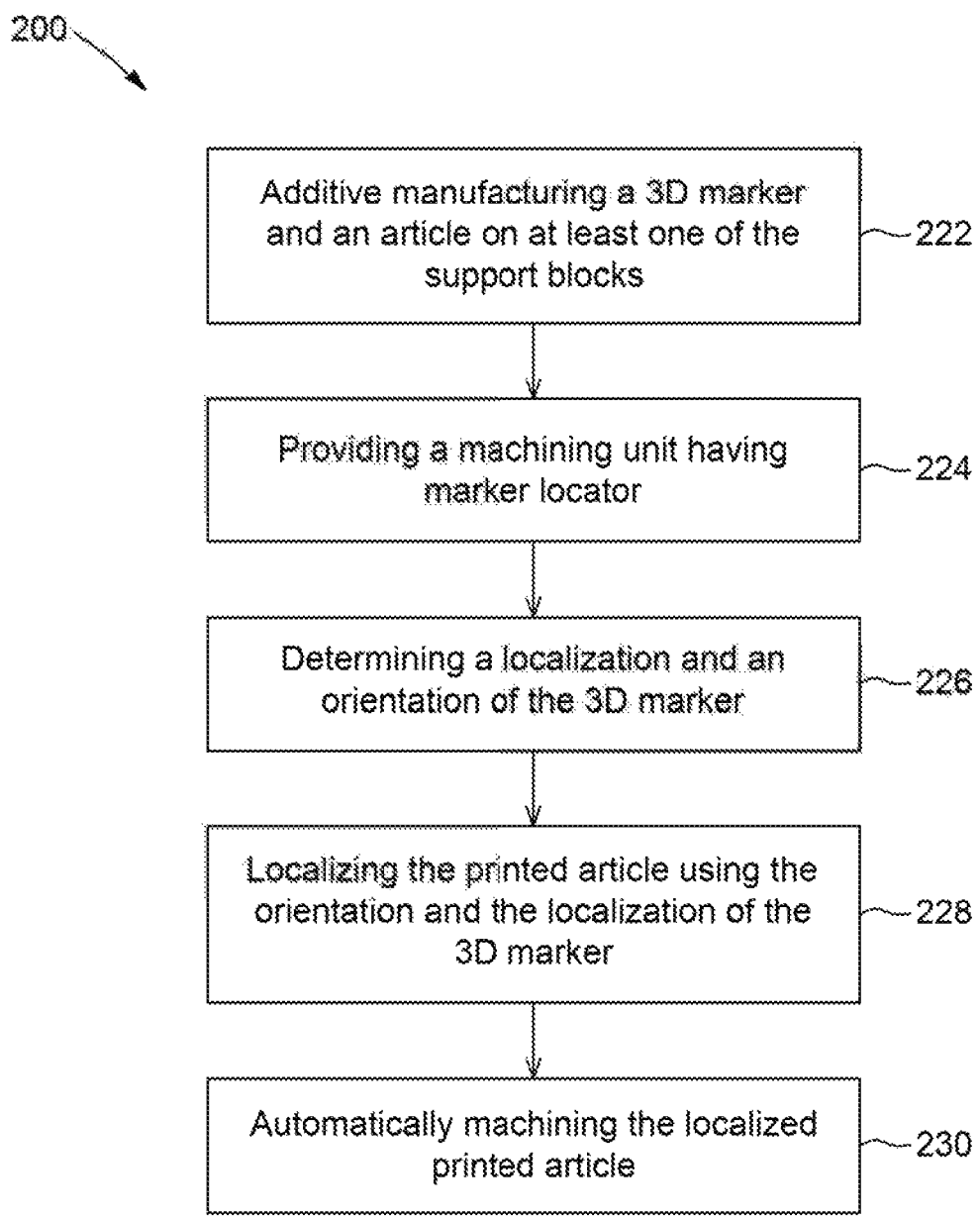

As represented in FIGS. 13 to 15, the method 200 firstly comprises a step 202 of providing an additive manufacturing system 110 and a support plate 112, 312 of an additive manufacturing support assembly 140, 340.

The method 200 then comprises a step 204 of providing at least one support block 130, 330 of the additive manufacturing support assembly 140, 340, the support block 130, 330 being removably engageable with the support plate 112, 312 and having an article printing surface 132, 332.

The method 200 then comprises a step 206 of engaging the support block 130, 330 with the support plate 112, 312 at respective ones of block engagement locations 114, 314 formed on the support plate 112, 312 (provided on an block engagement surface 116, 316 thereof, in the embodiment shown).

In the embodiment shown, the step 206 firstly comprises engaging together locating members 126, 326 of the support plate 112, 312 with locating members 135, 335 of the support block 130, 330, so as to precisely locate or position the support block 130, 330 on the block engagement surface 116, 316 of the support plate 112, 312.

The step 206 further comprises removably engaging coupling members 120, 320 of the support plate 112 (for instance coupling threaded heads 123 thereof) with coupling members 136, 336 of the support block 130, 330 (for instance with threaded holes 138 formed in a contact surface 134, 334 of the support block 130, 330).

It is understood that in the embodiment in which the coupling members 120 of the support plate 112 and the coupling members 136 of the support block 130 both ease and secure the arrangement of the support block 130 with the support plate 112, the engaging and the securing of the support block 130 with the support plate 112 are performed simultaneously by the engagement of the coupling members 120 of the support plate 112 with the coupling members 136 of the support block 130.

It is thus understood that the engaging, the positioning and the securing of the support block 130 with the support plate 112 at the block engagement location 114 is eased by the locating of the support block 130 at the block engagement location 114 via the locating members 126, 135 of the support plate 112 and the support block 130.

In the embodiments shown, the support plates 112, 312 are dimensioned so that a plurality of support blocks 130, 330 can be engaged therewith. As represented in FIG. 2, when the support blocks 130 are engaged with the support plate 112, the support blocks 130 are vertically aligned with each other. In other words, the different support blocks 130 are arranged so that their article printing surfaces 132 are at a substantially same second height h2.

The method 200 further comprises a step 207 of engaging the support plate 112, 312 with the additive manufacturing system 110.

It is appreciated that the present disclosure is not limited to support blocks 130 having article-printing surfaces 132 that would extend at a substantially same height when the support blocks 130 are engaged with the support plate 112. The method 200 could also comprise, as represented in FIG. 13, a step 207' of engaging the support plate 112, 312 with the additive manufacturing system 110 and setting or adjusting the article-printing surfaces 132 of the different support blocks 130 to a substantially identical printing or second height h2. The setting or adjusting of the article-printing surfaces 132 of the different support blocks 130 can comprise, for instance, wearing down the article-printing surface 132 of all or part of the support blocks 130. For instance, the setting or adjusting of the article-printing surfaces 132 of the different support blocks 130 comprises providing a grinding device and grinding the support blocks 130 having an article-printing surface 132 extending above the desired second height h2. The grinding device can either be configured to grind (for instance via a sandblasting process or any suitable process) simultaneously the article-printing surfaces 132 of all the support blocks 130 having an article-printing surface 132 extending above the desired second height h2, or to individually grind (for instance via a sandblasting process or any suitable process) the article-printing surface 132 of the support block 130 when required.

The method 200 could also comprise providing an additive manufacturing system 110 comprising a level adjustment assembly 118 selectively couplable to the base 111, and actuating the level adjustment assembly 118 so as to adjust a vertical position of the base 111. It is further understood that the support plate 112 is configured to alternatively receive single or multiple support blocks 130, depending on the dimensions and shape of the one or more articles to be printed by additive manufacturing. In other words, some of the block engagement locations 114 of the support plate 112 might remain empty for the following steps of the method 200.

It is understood that, in the embodiment shown, the coupling of the support blocks 130 with the support plate 112 is realized before the securing of the support plate 112 to the supporting surface 113 of the base 111 of the additive manufacturing system 110 (i.e. prior to the engaging of the support plate 112 with the additive manufacturing system 110).

It should also be understood that the additive manufacturing assembly 100 may alternatively be used to print articles directly on the supporting surface 113 of the base 111, or to print articles on the article printing surface 132 of the support block 130. For the additive manufacturing assembly 100 to change from one configuration to the other, the level adjustment assembly 118 might be actuated for the vertical position of the supporting surface 113 of the base 111 to be set or adjusted either at the second height h2, to print articles directly on the base 111, or to be adjusted at the first height h1 so that the article printing surface 132 of the support block 130 extends at the second height h2, to print articles on the article printing surface 132 of the support block 130. In other words, in the embodiment shown, the additive manufacturing system 110 is configured to be used with or without support blocks 130.

The method 200 then comprises a step 208 of printing by additive manufacturing at least one article 160 on the article printing surface 132 of the support block 130.

In the embodiment in which a plurality of support blocks 130 are engaged with the support plate 112, the step 207 of setting the article-printing surfaces 132 of the different support blocks 130 to the substantially same second height h2 ensures that all the support blocks 130 are configured in a similar zero point prior to the step 208 of printing by additive manufacturing articles 160 on the article-printing surfaces 132 of the support blocks 130.

It is thus understood that the shape, the dimensions and/or the number of the support blocks 130, 330 engaged with the support plate 112, 312 depends on the one or more articles to be printed. In other words, the shape, the dimensions and/or the number of the support blocks 130, 330 is determined as a function of the dimensions, the shape and the number of the one or more articles to be printed.

Figure 10:
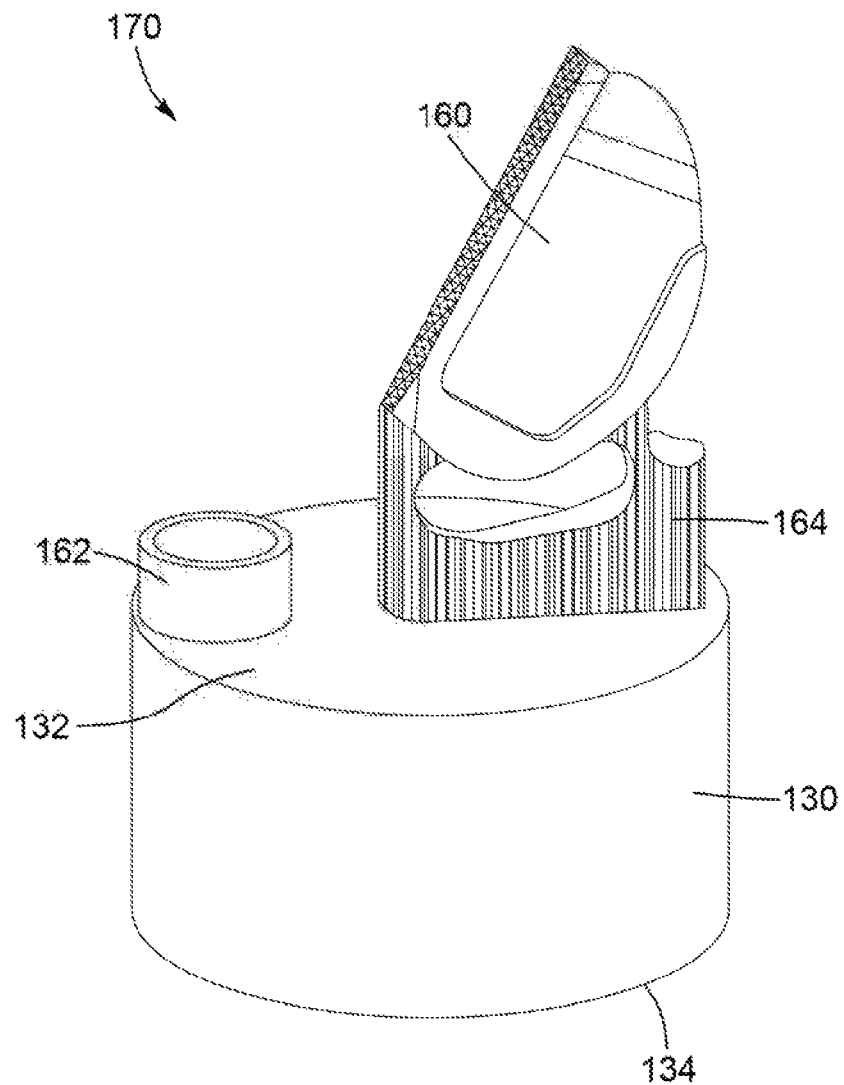
FIGS. 10 and 11 are respectively front and rear perspective views of one of the support blocks of FIG. 2, an article and a 3D marker being additive manufactured thereon.
Figure 11:
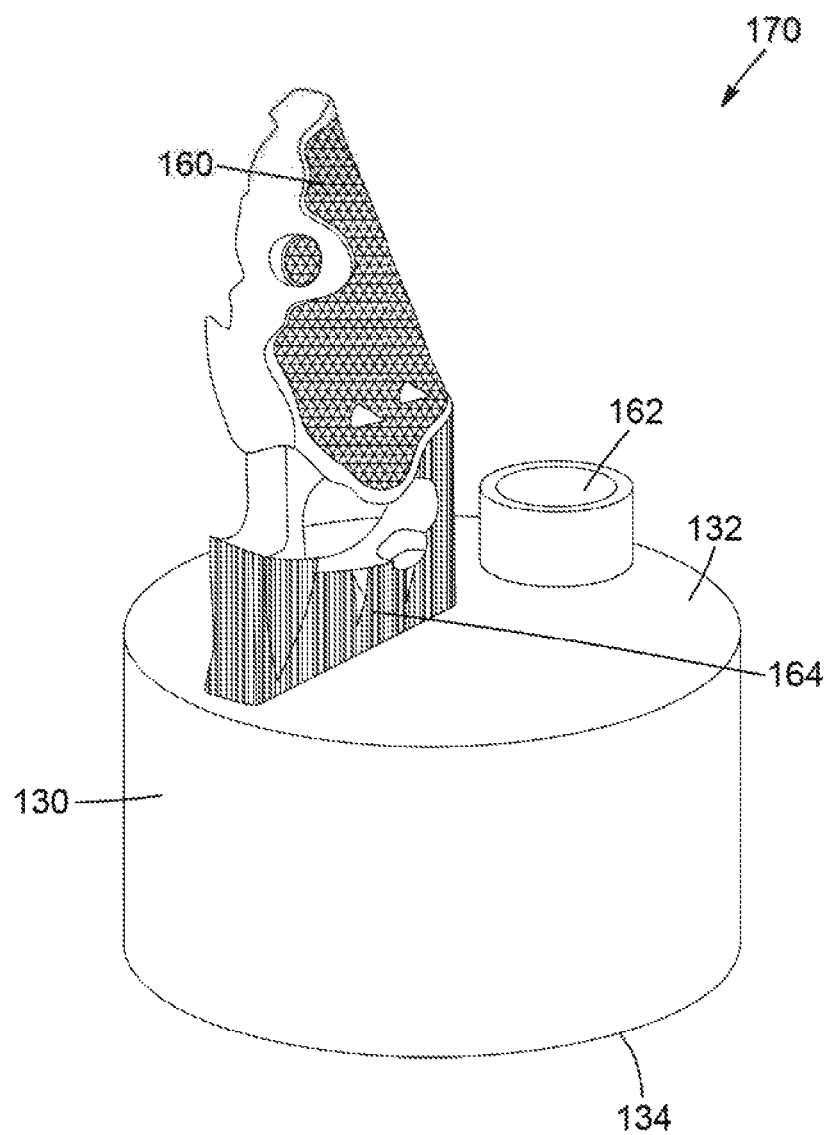

In some embodiments, the article 160 might be printed directly on the article-printing surface 132 of the support block 130. In some other embodiments, as represented in FIGS. 10 and 11, the article 160 might be printed on the article-printing surface 132 of the support block 130 via a printed support portion 164. In other words, a support portion 164 can be printed on the article-printing surface 132 of the support block 130, the article 160 being secured to the article-printing surface 132 of the support block 130 via the support portion 164. As mentioned below, the support portion 164 can be printed in a material having properties (for instance rigidity or stiffness properties) different from the properties of the printed article 160.

The method 200 then comprises a step 210 of removing, from the support plate 112, the support block(s) 130 having article(s) 160 printed thereon as a printed article and support block assembly 170. In the embodiment in which a support portion 164 is printed, the printed article and support block assembly 170 also comprises the support portion 164.

In the embodiment shown, the step 210 comprises disengaging the coupling members 120 and the locating members 126 of the support plate 130 from the coupling members 136 and the locating members 135 of the support block 130 (for instance removing the coupling heads 123 and the locating heads 127 from the holes formed in the contact surface 134 of the support block 130).

The method 200 further comprises a step 212 of providing a machining unit 150 including at least one support block receiver 152. The machining unit 150 might further comprise at least one support block locator 155.

As represented in FIG. 14, the method 200 then comprises a step 214 of engaging at least one of the support blocks 130 having the article(s) 160 printed thereon with the support block receiver 152 and the support block locator 155 of the machining unit 150. In other words, the method 200 comprises engaging the printed article and support block assembly 170 with the machining unit 150, the cooperation of the locating members 135 of the support block 130 with the support block locator 155 easing the engagement of the printed article and support block assembly 170 with the machining unit 150.

In the embodiment shown, the step 214 comprises engaging together the locating members 135 of the support block 130 and the support block locators 155 of the machining unit 150, and engaging the coupling threaded heads 154 of the machining unit 150 into the threaded holes 138 formed in the contact surface 134 of the support block 130.

The method 200 further comprises a step 216 of machining the additive manufactured article 160 bonded to the support block 130—either directly to the additive-printing surface 132 or via the support portion 164—engaged with the support block receiver 152 of the machining unit 150.

In the embodiment shown, the machining head 158 of the machining unit 150 is configured to be displaceable with respect to the support block 130 so as to machine the article 160.

In the embodiment in which the article 160 is printed on the support block 130 via the support portion 164, it is understood that the support portion 164 will be rigid enough to support the article 160 when it is machined by the machining head 158 of the machining unit 150. In other words, in the embodiment shown, the printed support portion 164 is made of a material having a rigidity or a stiffness greater than a stiffness of the printed article 160.

Moreover, it is understood that, since the printed article and support block assembly 170 is secured to the machining unit 150, the method 200 does not comprise a preliminary step of separating—for instance by cutting—the printed article 160 from the support block 130 on which the article 160 has been printed.

It is understood that the method 200 makes it possible to divide a printed piece into individual articles 160 and then to machine separately each individual article 160 on the article-printing surfaces 132 of distinct support blocks 130. In yet other words, the method 200 allows the machining of bulky printed pieces by dividing the bulky printed pieces into individual articles printed on different support blocks 130. The machining of the bulky printed pieces is thus eased thanks to the additive manufacturing assembly 100 according to the present disclosure.

In some embodiments, the machining unit 150 comprises a plurality of support block receivers 152 configured to receive a plurality of support blocks 130. Then, when a plurality of articles 160 might be engaged with the machining unit 150 via the support blocks 130 and the support block receivers 152. The machining of the different printed articles 160 might be realized either sequentially or simultaneously.

It should be understood that the processing of the printed article 160 is not necessarily limited to a machining step. The support block 130 could thus be further designed for the printed article and support block assembly 170 to receive other post processing treatments, such as, without be limitative, stain relief, plasma spray, . . . .

The method 200 then comprises a step 218 of separating the machined article 160 from the support block 130. In some embodiments, the step 218 comprises providing and using an EDM (Electrical Discharge Machining) wire cutting unit.

The method 200 further comprises a step 220 of disengaging the support block 130 from the support block receiver 152 of the machining unit 150.

The method 200 then comprises a step of machining—or resurfacing—the article-printing surface 132 of the support block 130 so that the support block 130 can then be used again for another article to be printed by additive manufacturing. In other words, the method 200 allows the support block 130 to be reused for further printing other articles by additive manufacturing.

In some embodiments, as represented in FIG. 15, the method 200 might further comprise, sequentially or simultaneously with the step 208 of additive manufacturing of the article 160 on the article-printing surface 132 of the support block 130, a step 222 of additive manufacturing at least one 3D marker 162 on the article-printing surface 132 of the support block 130.

In the embodiment shown, the 3D marker 162 has a predetermined shape. As represented in FIGS. 10 and 11, in the embodiment shown, the 3D marker 162 has a substantially cylindrical shape. It is appreciated that the shape of the 3D marker 162 and its location on the article-printing surface 132 of the support block 130 relatively to the printed article 160 (or relatively to the support 164, if one) can vary from the embodiment shown.

The method 200 might further comprise a step 224 of providing a machining unit 150 having a maker locator 156.

In some embodiments, the method 200 might further comprise, prior to the step 216 of machining the article 160, once the support block 130 has been engaged with the support block receiver 152 of the machining unit 150, a step 226 of localizing the 3D marker 162 and determining an orientation of the 3D marker 162 having the predetermined shape.

In the embodiment shown, the marker locator 156 of the machining unit 150 is configured to localize the 3D marker 162 on the article-printing surface 132 of the support block 130, and to determine the orientation of the 3D marker 162 thereon.

The method 200 might further comprise a step 228 of localizing the printed article 160, for instance by determining spatial coordinates (for instance in a pre-determined x, y, z orthogonal spatial system) of the article 160 printed on the article-printing surface 132 of the support block 130 engaged with the support block receiver 152 of the machining unit 150 by using the orientation and the localization of the 3D marker 162.

The step 216 of machining the article 160 might then further comprise a step 230 of automatically machining the article 160 based on the determined spatial coordinates of the article 160.

In the embodiment shown, the marker locator 156 is configured to cooperate with the mobile machining head 158 so as to automatically machine the article 160 on the basis of the localization of the 3D marker 162 on the support block 130 and/or of the determination of the orientation of the 3D marker 162.

It is to be understood that, in the above description, for simplicity purposes, the method 200 has been described for the printing of a single article 160 having a corresponding single 3D marker 162, both of them being printed on the article-printing surface 132 of a single support block 130. A single 3D marker 162 could also be used to determine spatial of a plurality of articles 160 that would be printed on the support block 130.

It will be appreciated that the method described herein may be performed in the described order, or in any suitable order.

Several alternative embodiments and examples have been described and illustrated herein. The embodiments of the disclosure described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the disclosure may be embodied in other specific forms without departing from the central characteristics thereof. The present examples and embodiments, therefore, are to be considered in all respects as illustrative and not restrictive, and the disclosure is not to be limited to the details given herein. Accordingly, while the specific embodiments have been illustrated and described, numerous modifications come to mind. The scope of the disclosure is therefore intended to be limited solely by the scope of the appended claims.

The invention claimed is:

1. An additive manufacturing support assembly for an additive manufacturing system, the additive manufacturing support assembly comprising:
    a support plate engageable with the additive manufacturing system, the support plate comprising an upper block engagement surface having a plurality of block engagement locations; and
    at least one support block couplable with the support plate and selectively disengageable from and re-engageable with the support plate at a respective one of said plurality of block engagement locations, said at least one support block having a contact surface superposed onto the upper block engagement surface of the support plate when said at least one support block is coupled with the support plate, said at least one support block further having an article-printing surface, opposed to the contact surface and spaced apart therefrom, for at least one article to be additive manufactured thereon at a distance from the upper block engagement surface of the support plate corresponding substantially to a height of the at least one support block.

2. The additive manufacturing support assembly according to claim 1, wherein each one of said plurality of block engagement locations of the support plate comprises a block-coupling member and said at least one support block comprise at least one plate-coupling member at least one of protruding from and extending through the contact surface thereof and configured to selectively cooperate with each one of the block-coupling members of the block engagement locations to removably engage the contact surface of said at least one support block with the upper block engagement surface of the support plate at each one of said plurality of block engagement locations thereof.

3. The additive manufacturing support assembly according to claim 2, wherein each one of said plurality of block engagement locations of the support plate comprises a block-locating member and said at least one support block comprises at least one plate-locating member at least one of protruding from and extending through the contact surface thereof and configured to selectively cooperate with each one of the block-locating members of the block engagement locations to precisely position said contact surface of said at least one support block on the upper block engagement surface of the support plate at each one of said plurality of block engagement locations thereof.

4. The additive manufacturing support assembly according to claim 1, wherein said at least one support block is selectively and removably engageable with at least one support block receiver of a machining unit.

5. The additive manufacturing support assembly according to claim 4, wherein said at least one support block comprises at least one coupling member at least one of extending through or protruding from the contact surface thereof, said at least one coupling member being removably engageable with at least one of the support plate at the at least one of the plurality of block engagement locations of the upper block engagement surface thereof and said at least one support block receiver of the machining unit.

6. The additive manufacturing support assembly according to claim 1, wherein the article-printing surface of said at least one support block is resurfacable.

7. An additive manufacturing kit for an additive manufacturing system, the additive manufacturing kit comprising:
a support plate engageable to the additive manufacturing system, the support plate comprising an upper block engagement surface having a plurality of block engagement locations; and
a plurality of support blocks, each one of the plurality of support blocks being couplable with the support plate and selectively disengageable from and reengageable with the support plate at a respective one of said plurality of block engagement locations, each one of said plurality of support blocks having a contact surface superposed onto the upper block engagement surface of the support plate when said each one of said plurality of support blocks is coupled with the support plate, each one of the plurality of support blocks further comprising an article printing surface opposed to the contact surface and spaced-apart therefrom for at least an article to be additive manufactured thereon at a distance from the upper block engagement surface of the support plate corresponding substantially to a height of said each one of the plurality of support blocks, said plurality of support blocks comprising support blocks having at least one of different shapes and different dimensions.

8. The additive manufacturing kit according to claim 7, further comprising at least one support block receiver engageable with a machining unit, at least one of said plurality of support blocks being selectively and removably engageable with said at least one support block receiver.

9. The additive manufacturing kit according to claim 7, wherein each one of said plurality of block engagement locations comprises a block-coupling member and each one of said plurality of support blocks comprises at least one plate-coupling member at least one of protruding from and extending through the contact surface thereof and configured to selectively cooperate with each one of the block-coupling members of the block engagement locations to removably engage the contact surface of each one of said plurality of support blocks with the upper block engagement surface of the support plate at a respective one of said plurality of block engagement locations thereof.

10. The additive manufacturing kit according to claim 9, wherein each one of said plurality of block engagement locations of the support plate comprises a block-locating member and each one of said plurality of support blocks comprise at least one plate-locating member at least one of protruding from and extending through the contact surface thereof and configured to selectively cooperate with each one of the block-locating members of the block engagement locations to precisely position said contact surface of each one of said plurality of support blocks on the upper block engagement surface of the support plate at a respective one of said plurality of block engagement locations thereof.

11. An additive manufacturing assembly comprising:
an additive manufacturing system configured to print one or more articles by additive manufacturing; and
an additive manufacturing support assembly according to claim 1, the support plate being engageable with the additive manufacturing system.

12. An additive manufacturing support assembly for an additive manufacturing system, the additive manufacturing support assembly comprising:
a support plate engageable with the additive manufacturing system, the support plate comprising an upper block engagement surface substantially planar and having a plurality of block engagement locations; and
at least one support block couplable with the support plate and selectively disengageable from and reengageable with the support plate at a respective one of said plurality of block engagement locations, said at least one support block having a contact surface superposed onto the upper block engagement surface of the support plate when said at least one support block is coupled with the support plate, said at least one support block further having an article-printing surface, opposed to the contact surface and spaced-apart therefrom, for at least one article to be additive manufactured thereon at a distance from the upper block engagement surface of the support plate.

13. The additive manufacturing support assembly according to claim 12, wherein each one of said plurality of block engagement locations of the support plate comprises a block-coupling member and said at least one support block comprises at least one plate-coupling member at least one of protruding from and extending through the contact surface thereof and configured to selectively cooperate with each one of the block-coupling members of the block engagement locations to removably engage the contact surface of said at least one support block with the upper block engagement surface of the support plate at each one of said plurality of block engagement locations thereof.

14. The additive manufacturing support assembly according to claim 13, wherein each one of said plurality of block engagement locations of the support plate comprises a block-locating member and said at least one support block comprises at least one plate-locating member at least one of protruding from and extending through the contact surface thereof and configured to selectively cooperate with each one of the block-locating members of the block engagement locations to precisely position said contact surface of said at least one support block on the upper block engagement surface of the support plate at each one of said plurality of block engagement locations thereof.

\* \* \* \* \*